(12) United States Patent
Shimomura et al.

(10) Patent No.: US 10,618,333 B2
(45) Date of Patent: Apr. 14, 2020

(54) IMAGE FORMING METHOD AND IMAGE FORMING APPARATUS

(71) Applicant: Konica Minolta, Inc., Tokyo (JP)

(72) Inventors: Midori Shimomura, Hino (JP); Yusuke Nishisaka, Mitaka (JP); Taiya Munenaka, Fuchu (JP); Yukimasa Azuma, Machida (JP); Kuniya Matsuura, Toyohashi (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 16/241,575

(22) Filed: Jan. 7, 2019

(65) Prior Publication Data

US 2019/0232701 A1  Aug. 1, 2019

(30) Foreign Application Priority Data

Jan. 30, 2018  (JP) .................... 2018-013554

(51) Int. Cl.
*B41J 2/01* (2006.01)
*B41M 5/52* (2006.01)
*B41M 5/025* (2006.01)
*C09D 11/322* (2014.01)
*B41M 5/00* (2006.01)

(52) U.S. Cl.
CPC .............. *B41M 5/0256* (2013.01); *B41J 2/01* (2013.01); *B41M 5/529* (2013.01); *C09D 11/322* (2013.01); *B41J 2002/012* (2013.01); *B41J 2202/03* (2013.01); *B41M 5/0017* (2013.01)

(58) Field of Classification Search
CPC ...... B41J 2/01; B41J 2/0057; B41J 2002/012; B41J 2202/03; B41M 5/0017; B41M 5/0256; B41M 5/529; C09D 11/322
See application file for complete search history.

(56) References Cited

U.S. PATENT DOCUMENTS

| | | | | |
|---|---|---|---|---|
| 8,459,762 | B2* | 6/2013 | Yui | B41J 2/0057 347/101 |
| 9,193,142 | B1* | 11/2015 | Moorlag | B41J 2/01 |
| 10,155,401 | B1* | 12/2018 | Condello | B41J 2/0057 |

FOREIGN PATENT DOCUMENTS

| | | |
|---|---|---|
| JP | 2013199114 A | 10/2013 |
| JP | 2016074206 A | 5/2016 |

* cited by examiner

*Primary Examiner* — Anh T Vo
(74) *Attorney, Agent, or Firm* — Lucas & Mercanti, LLP

(57) ABSTRACT

An image forming method, includes: forming a precoat layer by applying a precoat agent onto a front surface of an intermediate transfer body; forming an ink layer by applying an ink onto a front surface of the formed precoat layer, according to an ink jet method; and transferring the formed precoat layer and ink layer to a recording medium, wherein a contact angle of the precoat agent with respect to the front surface of the intermediate transfer body is less than a contact angle of the ink with respect to the front surface of the intermediate transfer body, and a viscosity of the precoat agent is lower than a viscosity of the ink.

3 Claims, 2 Drawing Sheets

IMAGE FORMING METHOD AND IMAGE FORMING APPARATUS

The entire disclosure of Japanese patent Application No. 2018-013554, filed on Jan. 30, 2018, is incorporated herein by reference in its entirety.

BACKGROUND

Technological Field

The present invention relates to an image forming method and an image forming apparatus.

Description of the Related Art

An image can be simply and inexpensively produced according to an ink jet method, and thus, the ink jet method has been applied to various printing fields including photographing, various printings, marking, and special printing such as a color filter. In particular, according to the ink jet method, digital printing can be performed without using a block, and thus, the ink jet method is particularly preferable for a use application in which small bits of various images are formed.

In the ink jet method, there is a case where a dot diameter of a landed ink is displaced according to surface roughness, ink absorbency, or the like of a recording medium on which an ink is landed. In contrast, in an intermediate transfer type image forming method, an intermediate image is formed by applying an ink onto an intermediate transfer body in which the dot diameter of the landed ink is easily controlled, and the intermediate image is transferred to the recording medium from the intermediate transfer body. Thus, it is expected that the displacement of the dot diameter is suppressed, and a higher-definition image is easily formed.

In the intermediate transfer type image forming method, there is a demand for an increase in a transfer rate of the ink to the recording medium from the intermediate transfer body. From the viewpoint of increasing the transfer rate, a method has been developed in which a precoat layer is formed by applying in advance a precoat agent onto the intermediate transfer body, and the precoat layer is transferred along with the ink, as a release layer.

Regarding the precoat agent, in JP 2013-199114 A, it is described that a precoat agent containing a specific siloxane compound is applied onto an intermediate transfer body of which a contact angle with respect to water is greater than or equal to 50 degrees and less than or equal to 120 degrees, and thus, the wettability and the releasability of the precoat agent with respect to the intermediate transfer body can be adjusted.

In addition, in JP 2016-074206 A, it is described that a suitable surfactant is used in a precoat agent containing a hydrophilic polymer such as polyvinyl alcohol, and thus, the wettability and the releasability of the precoat agent with respect to the intermediate transfer body can be adjusted.

According to the image forming method using the precoat agent, as described in JP 2013-199114 A and JP 2016-074206 A, it is expected that the precoat agent sufficiently wets and spreads to the intermediate transfer body, and transfer properties of the ink also increase. In particular, the precoat agent described in JP 2013-199114 A and JP 2016-074206 A, forms the precoat layer of which an adhesive force with respect to an ink landing surface is small, the precoat layer is peeled off before the inks landed on the intermediate transfer body are aggregated and peeled off, and thus, the transfer properties increase.

However, according to the study of the present inventors, even in the image forming method using such a precoat agent, the transfer properties of the ink do not sufficiently increase.

SUMMARY

The present invention has been made on the basis of the findings described above, and an object thereof is to provide an image forming method in which it is possible to further increase transfer properties of an ink in an intermediate transfer type image forming method using an ink jet ink, and an image forming apparatus in which the image forming method can be performed.

To achieve the abovementioned object, according to an aspect of the present invention, an image forming method reflecting one aspect of the present invention comprises: forming a precoat layer by applying a precoat agent onto a front surface of an intermediate transfer body; forming an ink layer by applying an ink onto a front surface of the formed precoat layer, according to an ink jet method; and transferring the formed precoat layer and ink layer to a recording medium, wherein a contact angle of the precoat agent with respect to the front surface of the intermediate transfer body is less than a contact angle of the ink with respect to the front surface of the intermediate transfer body, and a viscosity of the precoat agent is lower than a viscosity of the ink.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF EMBODIMENTS

Figure 1:
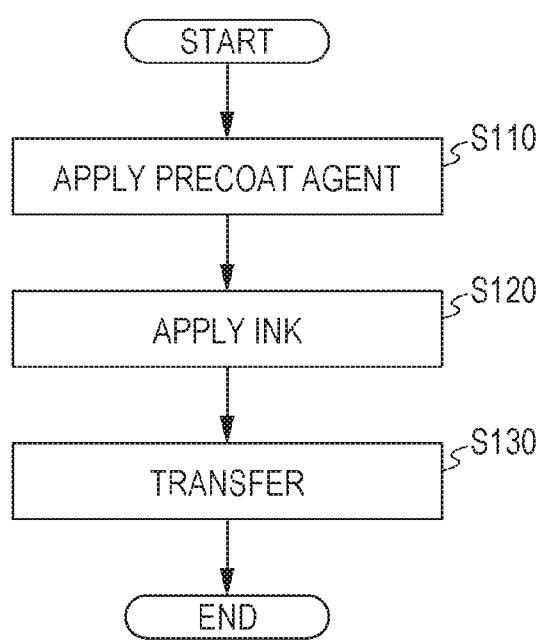
FIG. 1 is a flowchart illustrating an example of an intermediate transfer type image forming method using an ink jet ink, according to an embodiment of the present invention.

Hereinafter, one or more embodiments of the present invention will be described with reference to the drawings. However, the scope of the invention is not limited to the disclosed embodiments.

The present inventors have intensively studied in order to attain the object described above, have conceived that suitably adjusting a contact angle of a precoat agent and an ink with respect to a front surface of an intermediate transfer body on which the ink is landed (hereinafter, simply referred to as an "ink landing surface") as well as the viscosity of the precoat agent and the ink can increase the transfer properties of the ink, and have further conducted studies, and thus, have completed the present invention.

That is, even in a case where a precoat layer is formed by applying in advance the precoat agent onto the ink landing surface of the intermediate transfer body, there is a case where the ink applied later is infiltrated into the precoat layer. At this time, in particular, when the compatibility of the ink with respect to the ink landing surface of the intermediate transfer body is higher than the compatibility of the precoat agent with respect to the ink landing surface, the ink infiltrated into the precoat layer spreads thinly and is attached onto a front surface of the ink landing surface, with a strong adhesive force, and thus, there is a case where the ink is not sufficiently transferred.

In addition, in a case where an aggregation force of the ink is small, the ink is transferred by being separated in an ink layer formed by landing the ink on the intermediate transfer body, and thus, even in a case where the releasability of the precoat layer simply increases, there is a case where it is difficult to increase the transfer properties of the ink.

To deal with this problem, it is considered that, if the contact angle of the precoat agent with respect to the ink landing surface of the intermediate transfer body is set to be less than the contact angle of the ink with respect to the ink landing surface of the intermediate transfer body and if the wettability of the precoat agent with respect to the ink landing surface of the intermediate transfer body is set to be higher than the wettability of the ink with respect to the ink landing surface of the intermediate transfer body, the precoat agent more easily remains on the ink landing surface of the intermediate transfer body than the ink, and a decrease in the transfer properties due to the infiltration of the ink with respect to the precoat layer is suppressed.

Further, it is considered that, if the viscosity of the precoat agent is set to be lower than the viscosity of the ink and, thereby, peeling is more likely to occurs in the precoat layer before peeling occurs in the ink layer, the precoat layer is more easily released than the ink layer at the time of being transferred and an increase in the transfer properties of the ink according to the precoat can also be sufficiently ensured.

Hereinafter, an exemplary embodiment of the present invention will be described.

[Image Forming Method]

FIG. 1 is a flowchart illustrating an example of an intermediate transfer type image forming method using an ink jet ink, according to this embodiment.

In this embodiment, first, the precoat agent is applied onto the ink landing surface, in the front surface of the intermediate transfer body (Step S110).

The precoat agent may be applied to a region in the ink landing surface, in which at least the ink is landed. An applying method of the precoat agent is not particularly limited, and a method using a roll coater, a bar coater, and the like, an ink jet method, and the like can be used.

The precoat agent is applied onto the ink landing surface and, as necessary, is smoothed by a scraper or the like, and forms the precoat layer in contact with the ink landing surface. It is preferable that the thickness of the precoat layer is less than the thickness of the ink on an image to be formed, for example, is greater than or equal to 0.5 µm and less than or equal to 1.0 µm, from the viewpoint of suppressing a decrease in the transfer properties due to the sinking (the filtration) of the landed ink with respect to the precoat layer, in the subsequent step.

Next, the ink is applied onto a front surface of the formed precoat layer, according to an ink jet method (Step S120).

The ink is ejected from an ink jet head, and is landed on the front surface of the formed precoat layer, or is landed on a front surface of the ink landed in advance. At this time, a color ink according to the image to be formed is ejected, and is landed in a position according to the image to be formed, and thus, the ink layer is formed on the front surface of the precoat layer, and an intermediate image is formed on the ink landing surface of the intermediate transfer body.

At this time, the contact angle of the precoat agent with respect to the ink landing surface of the intermediate transfer body is less than the contact angle of the ink with respect to the ink landing surface of the intermediate transfer body. Thus, the precoat agent more easily approaches the front surface of the intermediate transfer body than the ink, and more easily remains on the front surface of the intermediate transfer body than the ink. Accordingly, it is easy to retain a state in which the precoat agent more homogeneously and more stably wets and spreads between the intermediate transfer body and the ink. For this reason, it is considered that a decrease in the transfer properties due to the sinking of the ink and the separation of a part of the precoat layer is suppressed.

Finally, the precoat layer and the ink layer, which are formed by applying the ink, are transferred to a recording medium (Step S130).

The precoat layer and the ink layer are transferred to the recording medium by pressurizing the intermediate transfer body in which the precoat layer and the ink layer are formed on the front surface, towards the transported recording medium.

At this time, the viscosity of the precoat agent is lower than the viscosity of the ink, and thus, the precoat agent is more likely to be released from the intermediate transfer body before the ink. Accordingly, it is considered that the precoat layer more homogeneously and more stably wetting and spreading between the intermediate transfer body and the ink is easily released along with the ink layer, and thus, the transfer properties of the ink also increase.

A pressure roller or a transporter or the like arranged to face the pressure roller may be heated, and the temperature of the precoat layer and the ink layer may be adjusted at the time of being transferred, from the viewpoint of increasing the transfer properties. The temperature adjustment, for example, can be performed such that the temperature of the heated precoat layer and ink layer is higher than or equal to 20° C. and lower than or equal to 45° C.

In a case where the ink is an active light ray curable ink, the image forming method according to this embodiment may include a step of curing the ink after being transferred. The ink can be cured, for example, by irradiating the transferred ink with an active light ray. Furthermore, in order to further stabilize a dot diameter of the ink, the ink may be temporarily cured by irradiating the ink before being transferred with an active light ray of a light amount at which the ink is not completely cured, and the ink may be completely cured by irradiating again the ink after being transferred with the active light ray.

[Precoat Agent]

The precoat agent is not particularly limited, but can be suitably selected from normal precoat agents used in the intermediate transfer type image forming method using the ink jet ink.

Here, the precoat agent is selected such that the contact angle of the precoat agent with respect to the ink landing surface of the intermediate transfer body is less than the contact angle of the ink with respect to the ink landing surface of the intermediate transfer body, and the viscosity of the precoat agent is lower than the viscosity of the ink.

The contact angle can be a value obtained by being measured at normal temperature and normal humidity (for example, 20° C. and 50% RH), by using a contact angle measuring device (a contact angle meter DM-301 or the like, manufactured by Kyowa Interface Science Co., Ltd.), according to a drop method.

The viscosity can be obtained by measuring a temperature change of dynamic viscoelasticity of the precoat agent or the ink, with a rheometer. The precoat agent or the ink is heated to 100° C., and is cooled to 20° C. in a condition of a shear rate of 11.7 (1/s) and a temperature dropping rate of 0.1° C./s, while measuring a viscosity with a stress control type rheometer (Physica MCR301 (a diameter of a cone-plate: 75 mm, and a cone angle: 1.0°), manufactured by Anton Paar GmbH), and thus, a temperature change curve of the viscosity is obtained. From the temperature change curve of the viscosity, obtained as described above, the temperature of the precoat agent or the ink at each temperature can be obtained.

In this embodiment, when at least the precoat agent and the ink are transferred to the recording medium, it is preferable that the viscosity of the precoat agent is lower than the viscosity of the ink. For this reason, the precoat agent of which the viscosity is lower than the viscosity of the ink, within a range of higher than or equal to 20° C. and lower than or equal to 45° C., which is a temperature at the time of being transferred, may be selected.

In addition, when an image is formed by using a plurality of types of inks, there is a case where an ink ejected later is landed on the front surface of the ink ejected and landed in advance. At this time, it is desirable that a difference between the contact angle of the precoat and the contact angle of the ink, with respect to the ink landing surface of the intermediate transfer body, is small and it is preferable that the difference is less than 20°, from the viewpoint of decreasing a difference in wetting and spreading properties between the ink landed on the front surface of the precoat layer, and the ink landed later on the front surface of the ink landed in advance, of decreasing a difference between ink diameters of each of the inks, and of easily forming a higher-definition image. Furthermore, the minimum value of the difference in the contact angles is not particularly limited, and is preferably greater than or equal to 5°, and is more preferably greater than or equal to 10°.

The precoat agent can be a liquid containing a liquid component such as water and a water-soluble organic solvent, and a surfactant for adjusting the contact angle and the viscosity. Alternatively, a liquid having a small surface tension, such as silicone oil, may be used as the precoat agent. In particular, in a case where the ink landing surface of the intermediate transfer body is formed of a silicone resin, the silicone oil having a low viscosity is preferable since a contact angle with respect to the ink landing surface of the intermediate transfer body is small.

Furthermore, in a case where the precoat agent contains a component of precipitating or aggregating color materials of the ink, such as a polyvalent metal ion and a polyvalent organic acid, it is easy to increase the viscosity of the ink at the time of transferring the precoat agent and the ink to the recording medium, and to set the viscosity of the precoat agent to be lower than the viscosity of the ink. However, in this embodiment, even in a case where the amount of such components in the precoat agent is small, it is easy to increase the transfer properties of the ink, according to the adjustment of the contact angle and the viscosity. For this reason, in this embodiment, it is preferable that the precoat agent does not substantially contain the polyvalent metal ion and the polyvalent organic acid. Not substantially containing indicates that the total content of the polyvalent metal ion and the polyvalent organic acid with respect to the total mass of the precoat agent is less than 0.1 mass %.

[Ink]

The ink is not particularly limited, and may be any normal ink used for forming an image according to an ink jet method.

(Material of Ink)

For example, in a case where the ink is a water-based ink, the ink is capable of containing water, and arbitrarily, a water-soluble organic solvent. In addition, in a case where the ink is a solvent-based ink, the ink is capable of containing an organic solvent. In addition, in a case where the ink is an active light ray curable ink, the ink is capable of containing a photopolymerizable compound that is polymerized and cross-linked by being irradiated with an active light ray, and arbitrarily, a photopolymerization initiator.

Further, the ink, as necessary, may contain a color material such as a colorant and a pigment, a dispersant for dispersing the pigment, a fixing resin for fixing the pigment to a base material, a surfactant, a polymerization inhibitor, a pH adjuster, a moisturizing agent, an ultraviolet absorber, a gellant of performing sol-gel phase transition with respect to the ink according to a temperature change, and the like. Only one type of the other components described above, or two or more types thereof may be contained in the ink.

Examples of the water-soluble organic solvent in a case where the ink is the water-based ink, include alcohol such as methanol, ethanol, propanol, isopropanol, butanol, isobutanol, sec-butanol, and t-butanol, glycerin such as ethylene glycol, diethylene glycol, triethylene glycol, polyethylene glycol, propylene glycol, dipropylene glycol, polypropylene glycol, butylene glycol, hexanediol, and pentanediol, polyvalent alcohol such as hexanetriol, thiodiglycol, 1,2-butanediol, 1,3-butanediol, 1,2-pentanediol, 1,2-hexanediol, and 1,2-heptanediol, amine such as ethanol amine, diethanol amine, triethanol amine, N-methyl diethanol amine, N-ethyl diethanol amine, morpholine, N-ethyl morpholine, ethylene diamine, diethylene diamine, triethylene tetramine, tetraethylene pentamine, polyethylene imine, pentamethyl diethylene triamine, and tetramethyl propylene diamine, amide such as formamide, N,N-dimethyl formamide, and N,N-dimethyl acetamide, a heterocyclic compound such as 2-pyrrolidone, N-methyl-2-pyrrolidone, cyclohexyl pyrrolidone, 2-oxazolidone, and 1,3-dimethyl-2-imidazolidinone, sulfoxide such as dimethyl sulfoxide, and glycol ether such as ethylene glycol monomethyl ether, ethylene glycol monoethyl ether, ethylene glycol monobutyl ether, ethylene glycol diethyl ether, ethylene glycol dimethyl ether, diethylene glycol monomethyl ether, diethylene glycol monoethyl ether, diethylene glycol monobutyl ether, diethylene glycol ethyl methyl ether, diethylene glycol dimethyl ether, diethylene glycol diethyl ether, diethylene glycol dibutyl ether, propylene glycol monomethyl ether, propylene glycol monoethyl ether, propylene glycol monobutyl ether, dipropylene glycol monomethyl ether, dipropylene glycol monoethyl ether, propylene glycol dimethyl ether, dipropylene glycol dimethyl ether, propylene glycol diethyl ether, dipropylene glycol diethyl ether, ethylene glycol monomethyl acetate, ethylene glycol monoethyl acetate, ethylene glycol monobutyl acetate, diethylene glycol monomethyl acetate, ethylene glycol monomethyl ether acetate, ethylene glycol monoethyl ether acetate, ethylene glycol monobutyl ether acetate, propylene glycol monomethyl ether acetate, propylene glycol monoethyl ether acetate, diethylene glycol monoethyl acetate, diethylene glycol monobutyl acetate, triethylene glycol monobutyl ether.

The content of the water-soluble organic solvent in a case where the ink is the water-based ink, for example, can be greater than or equal to 5.0 mass % and less than or equal to 30 mass %, with respect to the total mass of the ink.

Examples of the organic solvent in a case where the ink is the solvent-based ink, include a water-soluble organic solvent and a water-insoluble organic solvent that can be used in the water-based ink.

Examples of the water-insoluble organic solvent, include aliphatic hydrocarbon having carbon atoms of greater than or equal to 5 and less than or equal to 15, such as pentane, hexane, i-hexane, heptane, i-heptane, octane, i-octane, and decane, alicyclic hydrocarbon having carbon atoms of greater than or equal to 5 and less than or equal to 15, such as cyclopentane, cyclohexane, methyl cyclohexane, dimethyl cyclohexane, ethyl cyclohexane, cycloheptane, and cyclooctane, cyclic unsaturated hydrocarbon having carbon atoms of greater than or equal to 5 and less than or equal to 15, such as cyclohexene, cycloheptene, cyclooctene, 1,1,3,5,7-cyclooctatetraene, and cyclododecene, aromatic hydrocarbon having carbon atoms of greater than or equal to 6 and less than or equal to 12, such as benzene, toluene, ethyl benzene, cumene, o-xylene, m-xylene, and p-xylene, monohydric alcohol having carbon atoms of greater than or equal to 5 and less than or equal to 15, such as heptanol, hexanol, methyl hexanol, ethyl hexanol, heptanol, octanol, decanol, undecyl alcohol, and lauryl alcohol, alicyclic ketone having carbon atoms of greater than or equal to 5 and less than or equal to 15, such as methyl-i-butyl ketone, di-i-butyl ketone, cyclohexanone, methyl cyclohexanone, cycloheptanone, and cyclooctanone, an ester compound such as methyl acetate, ethyl acetate, propyl acetate, i-propyl acetate, butyl acetate, hexyl acetate, amyl acetate, i-amyl acetate, 2-ethyl hexyl acetate, methyl propionate, ethyl propionate, butyl propionate, hexyl propionate, amyl propionate, ethyl valerate, ethyl hexanoate, ethyl heptanoate, ethyl octanoate, ethyl decanoate, cyclohexyl acetate, cyclooctyl acetate, phenyl acetate, phenyl propionate, methyl benzoate, ethyl benzoate, butyl benzoate, dimethyl phthalate, diethyl phthalate, and dibutyl phthalate, a nitro compound such as nitroethane, nitropropane, nitropentane, nitrobenzene, dinitrobenzene, nitrotoluene, and nitroxylene, nitriles such as acetonitrile and benzonitrile, and lactones such as γ-butyrolactone and ε-caprolactone.

The content of the water-insoluble organic solvent in a case where the ink is the solvent-based ink can be, for example, greater than or equal to 1.0 mass % and less than or equal to 98 mass %, is more preferably greater than or equal to 20 mass % and less than or equal to 95 mass %, and is even more preferably greater than or equal to 40 mass % and less than or equal to 90 mass %, with respect to the total mass of the ink.

Examples of the photopolymerizable compound in a case where the ink is the active light ray curable ink, include a radical polymerizable compound and a cationic polymerizable compound. The photopolymerizable compound may be any one of a monomer, a polymerizable oligomer, a prepolymer, and a mixture thereof.

Examples of the active light ray include an ultraviolet ray, an electron ray, an α ray, a γ ray, and an x-ray. It is preferable that the active light ray is an ultraviolet ray or an electron ray, from the viewpoint of safeness and a possibility that the polymerization and the cross-linkage can be performed at a lower energy amount.

The radical polymerizable compound is preferably an unsaturated carboxylic ester compound, and is more preferable (meth)acrylate. Furthermore, herein, "(meth)acrylate" indicates acrylate or methacrylate, "(meth)acryl" indicates acryl or methacryl, and "(meth)acryloyl" indicates acryloyl or methacryloyl.

Examples of monofunctional (meth)acrylate include isoamyl (meth)acrylate, stearyl (meth)acrylate, lauryl (meth)acrylate, octyl (meth)acrylate, decyl (meth)acrylate, isomyristyl (meth)acrylate, isostearyl (meth)acrylate, 2-ethyl hexyl-diglycol (meth)acrylate, 2-hydroxy butyl (meth)acrylate, 2-(meth)acryloyloxy ethyl hexahydrophthalate, butoxy ethyl (meth)acrylate, ethoxy diethylene glycol (meth)acrylate, methoxy diethylene glycol (meth)acrylate, methoxy polyethylene glycol (meth)acrylate, methoxy propylene glycol (meth)acrylate, phenoxy ethyl (meth)acrylate, tetrahydrofurfuryl (meth)acrylate, isobornyl (meth)acrylate, 2-hydroxy ethyl (meth)acrylate, 2-hydroxy propyl (meth)acrylate, 2-hydroxy-3-phenoxy propyl (meth)acrylate, 2-(meth)acryloyloxy ethyl succinate, 2-(meth)acryloyloxy ethyl phthalate, 2-(meth)acryloyloxy ethyl-2-hydroxy ethyl-phthalate, and t-butyl cyclohexyl (meth)acrylate.

Examples of polyfunctional (meth)acrylate include bifunctional (meth)acrylate such as triethylene glycol di(meth)acrylate, tetraethylene glycol di(meth)acrylate, polyethylene glycol di(meth)acrylate, tripropylene glycol di(meth)acrylate, polypropylene glycol di(meth)acrylate, 1,4-butanediol di(meth)acrylate, 1,6-hexanediol di(meth)acrylate, 1,9-nonanediol di(meth)acrylate, neopentyl glycol di(meth)acrylate, dimethylol-tricyclodecane di(meth)acrylate, PO adduct di(meth)acrylate of bisphenol A, hydroxy pivalate neopentyl glycol di(meth)acrylate, polytetramethylene glycol di(meth)acrylate, polyethylene glycol diacrylate, and tripropylene glycol diacrylate, and trifunctional or higher (meth)acrylate such as trimethylol propane tri(meth)acrylate, pentaerythritol tri(meth)acrylate, pentaerythritol tetra(meth)acrylate, dipentaerythritol hexa(meth)acrylate, ditrimethylol propane tetra(meth)acrylate, glycerin propoxy tri(meth)acrylate, and pentaerythritol ethoxy tetra(meth)acrylate.

It is preferable that the radical polymerizable compound contains (meth)acrylate modified with ethylene oxide or propylene oxide (hereinafter, simply referred to as "modified (meth)acrylate"). The modified (meth)acrylate has higher photosensitivity. In addition, the modified (meth)acrylate is more compatible with other ink components at a high temperature. Further, the modified (meth)acrylate has small cure shrinkage, and thus, curling rarely occurs on a printed material at the time of forming an image.

Examples of the cationic polymerizable compound include an epoxy compound, a vinyl ether compound, and an oxetane compound.

The content of the photopolymerizable compound in a case where the ink is the active light ray curable ink, for example, can be greater than or equal to 1.0 mass % and less than or equal to 97 mass %, and is preferably greater than or equal to 30 mass % and less than or equal to 90 mass %, with respect to the total mass of the ink.

In a case where the ink is the active light ray curable ink, any photopolymerization initiator capable of initiating the polymerization of the photopolymerizable compound can be used. For example, in a case where the ink contains the radical polymerizable compound, the photopolymerization initiator can be a photoradical initiator, and in a case where the ink contains the cationic polymerizable compound, the photopolymerization initiator can be a photocationic initiator (a photo-acid-generating agent).

The content of the photopolymerization initiator can be arbitrarily set within a range where the ink is sufficiently cured by being irradiated with the active light ray, and ejection properties of the ink do not decrease. For example, the content can be greater than or equal to 0.1 mass % and less than or equal to 20 mass %, and can be preferably greater than or equal to 1.0 mass % and less than or equal to 12 mass %, with respect to the total mass of the ink. Furthermore, when the ink is sufficiently cured without using the photopolymerization initiator, such as a case where the ink is cured by being irradiated with the electron ray, the photopolymerization initiator is not necessary.

Examples of the color material include a colorant and a pigment. It is preferable that the color material is the pigment from the viewpoint of forming an image having excellent weather resistance. The pigment can be selected, for example, from a yellow pigment, a red or a magenta pigment, a blue or a cyan pigment, and a black pigment, according to the color of the image to be formed.

It is preferable that the dispersant is capable of sufficiently dispersing the pigment. Examples of the dispersant include hydroxyl group-containing carboxylic ester, a salt of long-chain polyaminoamide and macromolecular acid ester, a salt of a macromolecular polycarboxylic acid, a salt of long-chain polyaminoamide and polar acid ester, macromolecular unsaturated acid ester, a macromolecular copolymer, modified polyurethane, modified polyacrylate, a polyether ester type anionic activator, a salt of a naphthalene formalin sulfonate condensate, a salt of an aromatic formalin sulfonate condensate, polyoxy ethylene alkyl phosphate ester, polyoxy ethylene nonyl phenyl ether, and stearyl amine acetate.

The content of the dispersant, for example, can be greater than or equal to 20 mass % and less than or equal to 70 mass % with respect to the total mass of the pigment.

Examples of the fixing resin include a (meth)acrylic resin, an epoxy resin, a polysiloxane resin, a maleic acid resin, a vinylic resin, a polyamide resin, nitrocellulose, cellulose acetate, ethyl cellulose, an ethylene-acetate vinyl copolymer, a urethane resin, a polyester resin, and an alkyd resin.

The content of the fixing resin, for example, can be greater than or equal to 1.0 mass % and less than or equal to 10.0 mass % with respect to the total mass of the ink. Furthermore, such particles are capable of being amorphous, and of performing self-film formation, and thus, the ink may not substantially contain the fixing resin.

Examples of the surfactant include an anionic surfactant such as dialkyl sulfosuccinates, alkyl naphthalene sulfonates, and fatty acid salts, a nonionic surfactant such as polyoxy ethylene alkyl ethers, polyoxy ethylene alkyl allyl ethers, acetylene glycols, and polyoxy ethylene-polyoxy propylene block copolymers, a cationic surfactant such as alkyl amine salts and quaternary ammonium salts, a silicone-based surfactant, and a fluorine-based surfactant.

It is preferable that the content of the surfactant is greater than or equal to 0.001 mass % and less than 5.0 mass % with respect to the total mass of the ink.

Examples of the gellant include ketone wax, ester wax, petroleum-based wax, botanical wax, animal wax, mineral-based wax, cured castor oil, modified wax, a higher fatty acid, higher alcohol, a hydroxy stearic acid, fatty acid amide such as N-substituted fatty acid amide, and special fatty acid amide, higher amine, ester of a sucrose fatty acid, synthetic wax, dibenzylidene sorbitol, a dimer acid, dimer diol, and the like. Among them, from the viewpoint of further increasing pinning properties of the ink, the ketone wax, the ester wax, the higher fatty acid, the higher alcohol, and the fatty acid amide are preferable, and the ketone wax or the ester wax, in which the number of carbon atoms of carbon chains arranged on both sides interposing a keto group or an ester group therebetween is greater than or equal to 9 and less than or equal to 25, is more preferable.

It is preferable that the content of the gellant is greater than or equal to 1.0 mass % and less than or equal to 10.0 mass % with respect to the total mass of the ink.

(Physical Properties of Ink)

In a case where the ink is an ink not containing the gellant, it is preferable that the viscosity of the ink at 40° C. is greater than or equal to 3 mPa·s and less than or equal to 20 mPa·s, from the viewpoint of further increasing injection properties from the ink jet head. In addition, in a case where the ink is an ink containing the gellant, it is preferable that the viscosity of the ink at 80° C. is greater than or equal to 3 mPa·s and less than or equal to 20 mPa·s.

In a case where the ink contains the gellant, it is preferable that the ink has a phase transition temperature, at which sol-gel phase transition is performed, at a temperature higher than or equal to 40° C. and lower than or equal to 70° C. In a case where the phase transition temperature of the ink is higher than or equal to 40° C., the ink promptly thickens after being landed on the base material, and thus, the degree of wetting and spreading is more easily adjusted. In a case where the phase transition temperature of the ink is lower than or equal to 70° C., it is difficult to gelate the ink when the ink is injected from an ejection head in which an ink temperature is normally approximately 80° C., and thus, it is possible to more stably inject the ink.

The viscosity at 40° C., the viscosity at 80° C., and the phase transition temperature of the ink can be obtained by measuring a temperature change of dynamic viscoelasticity of the ink, with a rheometer. Herein, the viscosity and the phase transition temperature are a value obtained by the following method. The ink is heated to 100° C., and is cooled to 20° C. in a condition of a shear rate of 11.7 (1/s) and a temperature dropping rate of 0.1° C./s, while measuring the viscosity with a stress control type rheometer (Physica MCR301 (a diameter of a cone-plate: 75 mm, and a cone angle: 1.0°), manufactured by Anton Paar GmbH), and thus, a temperature change curve of the viscosity is obtained. The viscosity at 80° C. and the viscosity at 25° C. are obtained by respectively reading out the viscosity at 40° C. and the viscosity at 80° C. on the temperature change curve of the viscosity. The phase transition temperature is obtained as a temperature at which the viscosity is 200 mPa·s, in the temperature change curve of the viscosity.

[Image Forming Apparatus]

Figure 2:
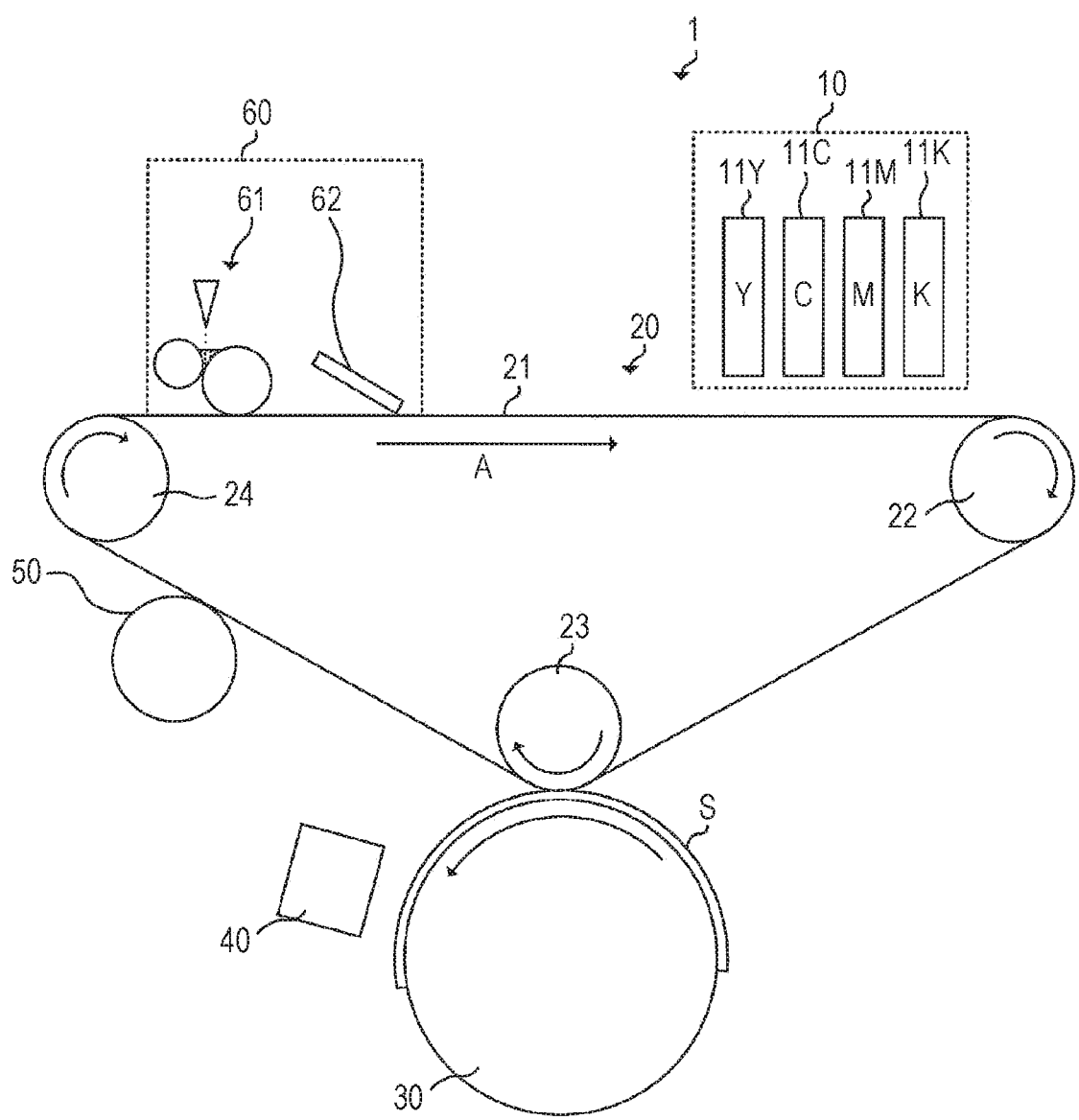
FIG. 2 is a schematic view illustrating a configuration of an image forming apparatus for performing the image forming method according to an embodiment of the present invention.

FIG. 2 is a schematic view illustrating a configuration of an image forming apparatus for performing the image forming method. As illustrated in FIG. 2, an image forming apparatus 1 is an intermediate transfer type image forming apparatus using an ink jet system. The image forming apparatus 1 includes an ink layer former 10, an intermediate transferor 20, a transporter 30, a light irradiator 40, a cleaner 50, and a precoat layer former 60.

As illustrated in FIG. 2, the ink layer former 10 includes ink jet heads 11Y, 11C, 11M, and 11K, and ejects an ink as an example of a coating material of each color of yellow (Y), magenta (M), cyan (C), and black (K), to the intermediate transferor 20. Furthermore, the ink jet heads 11Y, 11C, 11M, and 11K have the same configuration, and thus, in the following description, for the sake of convenience, Y, M, C, and K will be omitted.

The ink to be ejected from each of the ink jet heads, may be a water type ink containing water, and arbitrarily, a small amount of an organic solvent, as a liquid component, may be a solvent-based ink containing an organic solvent as a liquid component but not substantially containing water, or may be an active light ray curable ink containing a photopolymerizable compound that is polymerized and cross-linked by being irradiated with an active light ray such as an ultraviolet ray and an electron ray, as a liquid component. In this embodiment, the ink to be ejected is the active light ray curable ink.

The intermediate transferor 20 includes an intermediate transfer body 21, and three support rollers 22, 23, and 24. The intermediate transfer body 21 includes an endless belt, and is stretched in three support rollers 22, 23, and 24 in the shape of an inverted triangle.

In three support rollers 22, 23, and 24, at least one roller is a driving roller, and rotates the intermediate transfer body 21 in an A direction (in FIG. 2, a clockwise direction).

The intermediate transfer body 21 includes a base material layer containing a resin having structure unit including a benzene ring such as aromatic polyimide (PI), aromatic polyamide imide (PAI), polyphenylene sulfide (PPS), aromatic polyether ether ketone (PEEK), aromatic polycarbonate, and aromatic polyether ketone, polyvinylidene fluoride, a mixture or a copolymer thereof, and the like. The intermediate transfer body 21 may include both or any one of an elastic layer containing rubber such as silicone rubber (SR), chloroprene rubber (CR), nitrile rubber (NBR), and epichlorohydrin rubber (ECO), an elastomer, an elastic resin, and the like, and a front surface layer containing a fluorine resin such as polytetrafluoroethylene (PTFE), perfluoroalkoxy alkane (PFA), and polyvinylidene fluoride (PVDF), an acryl resin, and the like, on the ink landing surface side, in addition to the base material layer.

Alternatively, the intermediate transfer body 21 may be formed of a resin film such as a polyethylene terephthalate (PET) film, an 1,4-polycyclohexylene dimethylene terephthalate film, a polyethylene naphthalate (PEN) film, a polyphenylene sulfide film, a polystyrene (PS) film, a polypropylene (PP) film, a polysulfone film, an aramid film, a polycarbonate film, a polyvinyl alcohol film, a cellulose derivative such as cellophane and acetate cellulose, a polyethylene (PE) film, a polyvinyl chloride film, a nylon film, a polyimide film, and an ionomer film.

In the intermediate transfer body 21, a portion stretched between the support rollers 22 and 24 positioned on right and left vertex portions of the shape of an inverted triangle is the ink landing surface to which the ink is ejected from each of the ink jet heads. In the intermediate transfer body 21, the support roller 23 positioned on a vertex portion on a lower side of the shape of an inverted triangle is a pressure roller pressurizing the intermediate transfer body 21 towards the transporter 30 with a predetermined nip pressure, and functions as the transferor that transfers the intermediate image formed by landing the ink ejected from each of the ink jet heads, to a recording medium S.

The transporter 30 includes a metal drum, and is pressurized to the support roller 23, and thus, forms a transfer nip. The transporter 30 includes a claw (not illustrated) fixing the tip end of the recording medium S. The transporter 30 fixes the tip end of the recording medium S to the claw, and rotates the recording medium S in a counterclockwise direction in FIG. 2, and thus, transports the recording medium S as an example of the recording medium, to the transfer nip.

The ink that has been ejected from each of the ink jet heads and has been landed on the front surface of the intermediate transfer body 21 is transported to the transfer nip of the support roller 23 and the transporter 30, according to the rotation of the intermediate transfer body 21. Then, the ink transported to the transfer nip is transferred to the recording medium S that is transported by the transporter 30.

The light irradiator 40 faces a portion on a downstream side of the transfer nip of the transporter 30, and irradiates the ink on the recording medium S with an active light ray, and thus, cures the ink. Furthermore, in a case where the ink to be ejected from each of the ink jet heads is the water type ink or the solvent-based ink, the light irradiator 40 is not necessary.

The cleaner 50 is a cleaning roller such as a web roller or a sponge roller, and is in contact with the portion on the downstream side of the transfer nip of the intermediate transfer body 21. The cleaner 50 is driven and rotated under the control of a controller, and thus, removes the remaining ink (the remaining coating material) remaining on the intermediate transfer body 21 without being transferred onto a sheet S in the transfer nip.

The precoat layer former 60 includes a roll coater 61 of which a front surface is covered with a sponge, and a scraper 62. The roll coater 61 applies the precoat agent onto the ink landing surface side of the intermediate transfer body 21. The scraper 62 smooths the front surface of the applied precoat agent by removing the excessive amount of precoat agent, and the precoat agent spreads on the ink landing surface side of the intermediate transfer body 21 with a predetermined thickness, and thus, the precoat layer is formed. Furthermore, the precoat layer former 60 may apply the precoat agent according to a method using a bar coater, an ink jet method, or the like.

EXAMPLES

Hereinafter, a specific example of the present invention will be described along with a comparative example, but the present invention is not limited thereto.

1. Precoat Agent and Ink 1-1. Precoat Agent 0.01 part by mass of a surfactant (EMAL AD-25R, manufactured by Kao Corporation ("EMAL" is a registered trademark of Kao Corporation)) was added to 100 parts by mass of pure water, and was set to a precoat agent 1.

High-viscosity silicone oil (KF-96H-10000cs, manufactured by Shin-Etsu Chemical Co., Ltd.) was prepared, and was set to a precoat agent 2.

Low-viscosity silicone oil (KF-96H-500cs, manufactured by Shin-Etsu Chemical Co., Ltd.) was prepared, and was set to a precoat agent 3.

1.0 part by mass of a surfactant (EMAL AD-25R, manufactured by Kao Corporation) was added to 100 parts by mass of pure water, and was set to a precoat agent 4.

A contact angle of the precoat agent 1 to the precoat agent 4 with respect to silicone rubber described below, used as the elastic layer of the intermediate transfer body, was measured by using a contact angle measuring device (a contact angle meter DM-301, manufactured by Kyowa Interface Science Co., Ltd.), according to a drop method.

The precoat agent 1 to the precoat agent 4 were heated to 100° C., and were cooled to 20° C. in a condition of a shear rate of 11.7 (1/s) and a temperature dropping rate of 0.1° C./s, while measuring a viscosity with a stress control type rheometer (Physica MCR301 (a diameter of a cone-plate: 75 mm, and a cone angle: 1.0°), manufactured by Anton Paar GmbH), and thus, a temperature change curve of the viscosity was obtained. From the temperature change curve of the viscosity, obtained as described above, the viscosity of the precoat agent 1 to the precoat agent 4 at 40° C. was obtained.

1-2. Ink

A pigment dispersant, a photopolymerizable compound, and a polymerization inhibitor, described below, were put into a stainless steel beaker, and were heated and stirred for 1 hour while being heated by a hot plate of 65° C.

| | |
|---|---|
| Pigment Dispersant: Ajisper PB824 (manufactured by Ajinomoto Fine Techno Company) | 9 parts by mass |
| Photopolymerizable Compound: tripropylene glycol diacrylate | 70 parts by mass |
| Polymerization Inhibitor: Irgastab UV10 (manufactured by BASF Japan Ltd.) | 0.02 part by mass |

The mixed liquid was cooled to a room temperature, and then, 21 parts by mass of Pigment Red 122 (CHROMOFINERED 6112JC, manufactured by Dainichiseika Color & Chemicals Mfg. Co., Ltd.) was added to the mixed liquid. The mixed liquid was put into a glass bottle along with 200 g of zirconia beads having a diameter of 0.5 mm, the bottle was closed with an airtight stopper, and a dispersion treatment was performed for 8 hours in a paint shaker. After that, the zirconia beads were removed, and thus, a pigment dispersion liquid 1 was produced.

A photopolymerizable compound, a photopolymerization initiator, a polymerization inhibitor, a surfactant, a gellant, described below, and the pigment dispersant 1 were mixed, were heated to 100° C., and were stirred. After that, the obtained liquid was filtered through a metal mesh filter of #3000 under heating, and then, was cooled, and thus, an ink 1 was prepared.

| | |
|---|---|
| Photopolymerizable Compound: polyethylene glycol #400 diacrylate | 29.9 parts by mass |
| Photopolymerizable Compound: 4EO modified pentaerythritol tetraacrylate | 15.0 parts by mass |
| Photopolymerizable Compound: 6EO modified trimethylol propane triacrylate | 23.0 parts by mass |
| Photopolymerization Initiator: DAROCUR TPO (manufactured by BASF SE) | 6.0 parts by mass |
| Photopolymerization Initiator: ITX (manufactured by DKSH Japan K.K.) | 1.0 part by mass |
| Photopolymerization Initiator: DAROCUR EDB (manufactured by BASF SE) | 1.0 part by mass |
| Surfactant: KF-352 (manufactured by Shin-Etsu Chemical Co., Ltd.) | 0.1 part by mass |
| Gellant: a behenic acid (manufactured by Kao Corporation, LUNAC BA) | 5.0 parts by mass |
| Pigment Dispersion Liquid 1: | 19.0 parts by mass |

A photopolymerizable compound, a photopolymerization initiator, a polymerization inhibitor, a surfactant, described below, and the pigment dispersant 1 were mixed, were heated to 100° C., and were stirred. After that, the obtained liquid was filtered through a metal mesh filter of #3000 under heating, and then, was cooled, and thus, an ink 2 was prepared.

| | |
|---|---|
| Photopolymerizable Compound: polyethylene glycol #400 diacrylate | 34.9 parts by mass |
| Photopolymerizable Compound: 4EO modified pentaerythritol tetraacrylate | 15.0 parts by mass |
| Photopolymerizable Compound: 6EO modified trimethylol propane triacrylate | 23.0 parts by mass |
| Photopolymerization Initiator: DAROCUR TPO (manufactured by BASF SE) | 6.0 parts by mass |
| Photopolymerization Initiator: ITX (manufactured by DKSH Japan K.K.) | 1.0 part by mass |
| Photopolymerization Initiator: DAROCUR EDB (manufactured by BASF SE) | 1.0 part by mass |
| Surfactant: KF-352 (manufactured by Shin-Etsu Chemical Co., Ltd.) | 0.1 part by mass |
| Pigment Dispersion Liquid 1: | 19.0 parts by mass |
| Water-Soluble Organic Solvent: ethylene glycol | 15.0 parts by mass |
| Water-Soluble Organic Solvent: propylene glycol | 10.0 parts by mass |
| Water-Soluble Organic Solvent: glycerin | 4.5 parts by mass |
| Organic Acid Buffer Solution: a citric acid | 0.05 part by mass |
| Organic Acid Buffer Solution: a citric acid 3Na2 hydrate | 0.5 part by mass |
| Moisturizing Agent: ethylene urea | 1.5 parts by mass |
| Surfactant: OLFINE E1010 (manufactured by Nisshin Chemical Industry Co., Ltd.) | 0.05 part by mass |
| Color Material: C.I. Reactive Blue 72 | 15.0 parts by mass |
| Ion Exchange Water: a remnant (adjusted such that the total amount is 100 parts by mass) | |

A contact angle of the ink 1 to the ink 3 with respect to silicone rubber described below, used as the elastic layer of the intermediate transfer body, and the viscosity of the ink 1 at 40° C., were measured as with the precoat agent described above.

2. Image Formation

An image was formed in the following condition, by using an image forming apparatus having the configuration illustrated in FIG. 2.

A precoat layer former includes a roll coater of which a front surface is covered with a sponge, and a scraper, and a precoat layer was formed by applying any one of the precoat agent 1 to the precoat agent 4 described above.

An ink layer former including a piezoelectric ink jet head, an ink tank, a supply pipe, a front chamber ink tank immediately before a recording head, and piping with a filter was used. In the ink jet head, piezoelectric heads having a nozzle diameter of 24 µm and a definition of 512 dpi, were arranged in a staggered manner, and two line-head type ink jet heads having a recording definition of 1200 dpi×1200 dpi, were arranged back and forth in a transport direction. The ink tank communicated with each of the ink jet heads was filled with any one of the ink 1 to the ink 3, and 3.5 pl of the ink per one droplet, heated to 80° C., was ejected at an ejection speed of a liquid droplet of 6 m/sec, and was landed on a front surface of the precoat layer.

An intermediate transfer body was stretched in three support rollers (among them, one is a pressure roller) in the shape of an inverted triangle, by using an endless belt including a base material layer formed of polyimide (PI), and an elastic layer formed of silicone rubber, on an ink landing surface side of the base material layer, of which a length in an axis direction length is 800 mm. A roller having 0100 and a rubber pressure of 10 mm was used as the pressure roller. A load of a transferor due to the pressure roller was 80 N.

The transporter is a metal drum of a triple-cylinder for a printer, and a drum of sucking and retaining a recording medium by an air suction chuck and of transporting the recording medium was used.

A UV-LED light source having a wavelength of 395 nm was used as a light irradiator, and an irradiation intensity was 5 mW/cm$^2$.

The recording medium was printing coat paper A (OK Top Coat, unit basis weight of 84.9 g/m$^2$, manufactured by Oji Paper Co., Ltd.), printing coat paper B (New Age, unit basis weight of 104.7 g/m$^2$, manufactured by Oji Paper Co., Ltd.), and art paper (SA Kinfuji, unit basis weight of 104.7 g/m$^2$, manufactured by Oji Paper Co., Ltd.).

Each recording medium was transported to the image forming apparatus at 600 mm/s, and thus, 10 sheets of solid images having an A4 size (210 mm×300 mm) were formed.

2-1. Test 1

The ink tank communicated with each of the ink jet heads was filled with the ink 1 without applying the precoat agent from the precoat layer former, and thus, the image described above was formed.

2-2. Test 2

A precoat layer having a film thickness shown in Table 1 was formed by applying the precoat agent 1 from the precoat layer former, and the ink tank communicated with each of the ink jet heads was filled with the ink 1, and thus, the image described above was formed.

2-3. Test 3

A precoat layer having a film thickness shown in Table 1 was formed by applying the precoat agent 2 from the precoat layer former, and the ink tank communicated with each of the ink jet heads was filled with the ink 1, and thus, the image described above was formed.

2-4. Test 4

A precoat layer having a film thickness shown in Table 1 was formed by applying the precoat agent 3 from the precoat layer former, and the ink tank communicated with each of the ink jet heads was filled with the ink 1, and thus, the image described above was formed.

2-5. Test 5

A precoat layer having a film thickness shown in Table 1 was formed by applying the precoat agent 4 from the precoat layer former, and the ink tank communicated with each of the ink jet heads was filled with the ink 1, and thus, the image described above was formed.

3. Evaluation

The images formed on three types of recording media described above were evaluated on the basis of the following criteria. In each of the tests, the same evaluation was obtained for images formed on any recording medium.

The ink landing surface of the intermediate transfer body after image formation was subjected to visual observation or magnifying observation, and the ratio of the ink remaining on the intermediate transfer body without being transferred to the recording medium was examined, and was evaluated on the basis of the following criteria.

◯ The ink was not confirmed on the front surface of the intermediate transfer body in both of the visual observation and the magnifying observation Δ The ink was not confirmed on the front surface of the intermediate transfer body in the visual observation, but the ink remaining on the front surface of the intermediate transfer body was confirmed in the magnifying observation × The ink remaining on the front surface of the intermediate transfer body was confirmed even in the visual observation In addition, in the image formed in the test 4 and the image formed in the test 5, a portion in which an ink dot is laminated was subjected to the magnifying observation. Then, a difference between the average value of dot diameters of the dots formed in contact with the precoat layer and the average value of dot diameters of the dots formed in contact with the ink applied in advance was examined.

In the test 1 to the test 5, the type, the contact angle, and the viscosity at 40° C. of precoat agent, the film thickness of the precoat layer, the type, the contact angle, and the viscosity at 40° C. of ink, and the evaluation results are shown in Table 1.

TABLE 1

| | Precoat Agent | | | | Ink | | | Evaluation | |
|---|---|---|---|---|---|---|---|---|---|
| Test No. | No. | Contact Angle (°) | Viscosity (Pa · s) | Film Thickness (μm) | No. | Contact Angle (°) | Viscosity (Pa · s) | Transfer Properties | Note |
| 1 | — | — | — | — | 1 | 50 | 4000 | × | Comparative Example |
| 2 | 1 | 80 | 0.7 | 0.5 | 1 | 50 | 4000 | Δ | Comparative Example |
| 3 | 2 | 10 | 10000 | 0.5 | 1 | 50 | 4000 | Δ | Comparative Example |
| 4 | 3 | 10 | 500 | 0.5 | 1 | 50 | 4000 | ◯ | Example |
| 5 | 4 | 40 | 1.2 | 0.5 | 1 | 50 | 4000 | ◯ | Example |
| 6 | 1 | 80 | 0.7 | 0.5 | 2 | 50 | 15 | Δ | Comparative Example |
| 7 | 2 | 10 | 10000 | 0.5 | 2 | 50 | 15 | Δ | Comparative Example |
| 8 | 3 | 10 | 500 | 0.5 | 2 | 50 | 15 | Δ | Comparative Example |
| 9 | 4 | 40 | 1.2 | 0.5 | 2 | 50 | 15 | ◯ | Example |
| 10 | 1 | 80 | 0.7 | 0.5 | 3 | 70 | 4.5 | Δ | Comparative Example |
| 11 | 2 | 10 | 10000 | 0.5 | 3 | 70 | 4.5 | Δ | Comparative Example |
| 12 | 3 | 10 | 500 | 0.5 | 3 | 70 | 4.5 | Δ | Comparative Example |
| 13 | 4 | 40 | 1.2 | 0.5 | 3 | 70 | 4.5 | ◯ | Example |

Higher transfer properties of the ink were exhibited in the Test Nos. 4, 5, 9, and 13, in which the contact angle of the precoat agent with respect to the ink landing surface of the intermediate transfer body is less than the contact angle of the ink with respect to the ink landing surface of the intermediate transfer body and the viscosity of the precoat agent was lower than the viscosity of the ink.

In addition, in the image formed in the test 4, in which a difference between the contact angle of the precoat and the contact angle of the ink was greater than or equal to 20°, a difference between the average value of the dot diameters of the dots formed in contact with the precoat layer and the average value of the dot diameters of the dots formed in contact with the ink applied in advance was approximately 30%, but in the image formed in the test 4, in which a difference between the contact angle of the precoat and the contact angle of the ink was less than 20°, a difference between the average value of the dot diameters of the dots formed in contact with the precoat layer and the average value of the dot diameters of the dots formed in contact with the ink applied in advance was smaller, more specifically, approximately 10%.

By using the image forming method and the image forming apparatus of the present invention, it is possible to increase the transfer properties of the ink in the intermediate transfer type image forming method using the ink jet ink. For this reason, the present invention is expected to broaden the range of application of the intermediate transfer type image forming method using the ink jet ink, and to contribute to the advancement and the dissemination of the technology in the same field.

Although embodiments of the present invention have been described and illustrated in detail, the disclosed embodiments are made for purposes of illustration and example only and not limitation. The scope of the present invention should be interpreted by terms of the appended claims.

What is claimed is:

1. An image forming method, comprising:
forming a precoat layer by applying a precoat agent onto a front surface of an intermediate transfer body;
forming an ink layer by applying an ink onto a front surface of the formed precoat layer, according to an ink jet method; and
transferring the formed precoat layer and ink layer to a recording medium,
wherein a contact angle of the precoat agent with respect to the front surface of the intermediate transfer body is less than a contact angle of the ink with respect to the front surface of the intermediate transfer body, and
a viscosity of the precoat agent is lower than a viscosity of the ink.

2. The image forming method according to claim 1, wherein a difference between the contact angle of the precoat agent with respect to the front surface of the intermediate transfer body and the contact angle of the ink with respect to the front surface of the intermediate transfer body is less than 20°.

3. An image forming apparatus, comprising:
an intermediate transfer body;
a precoat layer former that forms a precoat layer by applying a precoat agent onto a front surface of the intermediate transfer body;
an ink layer former that forms an ink layer by applying an ink onto a front surface of the formed precoat layer, according to an ink jet method; and
a transferor that transfers the formed precoat layer and ink layer to a recording medium,
wherein a contact angle of the precoat agent with respect to the front surface of the intermediate transfer body is less than a contact angle of the ink with respect to the front surface of the intermediate transfer body, and
a viscosity of the precoat agent is lower than a viscosity of the ink.

* * * * *